(No Model.)

W. A. LOTSPEICH.
SHEET METAL GROOVING MACHINE.

No. 463,287. Patented Nov. 17, 1891.

WITNESSES
Geo. E. Frueh
Roland A. Fitzgerald

INVENTOR
W. A. Lotspeich,
per Lehmann Pattison,
Attys.

UNITED STATES PATENT OFFICE.

WILLIAM A. LOTSPEICH, OF MOHAWK, TENNESSEE.

SHEET-METAL-GROOVING MACHINE.

SPECIFICATION forming part of Letters Patent No. 463,287, dated November 17, 1891.

Application filed April 21, 1891. Serial No. 389,322. (No model.)

*To all whom it may concern:*

Be it known that I, WILLIAM A. LOTSPEICH, of Mohawk, in the county of Greene and State of Tennessee, have invented certain new and useful Improvements in Sheet-Metal-Grooving Machines; and I do hereby declare the following to be a full, clear, and exact description of the invention, such as will enable others skilled in the art to which it pertains to make and use it, reference being had to the accompanying drawings, which form part of this specification.

My invention relates to an improvement in sheet-metal-grooving machines; and it consists in the arrangement of parts, which will be fully described hereinafter.

The object of my invention is to provide a means for supporting the outer end of the pipe that is being grooved, so that the groove will be made perfectly regular; to adjustably connect the two portions of the frames together, so that the two shafts can be placed at a slight angle to each other, and to place the upper shaft in a vertically-adjustable frame, so that the upper die can rise over any double thickness of metal or any irregularity in the pipe.

Figure 1:
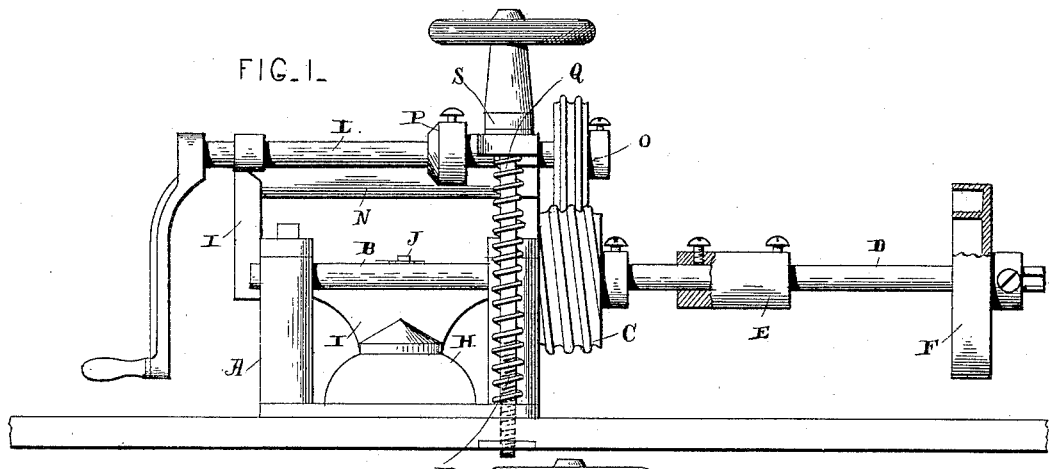
Figure 2:
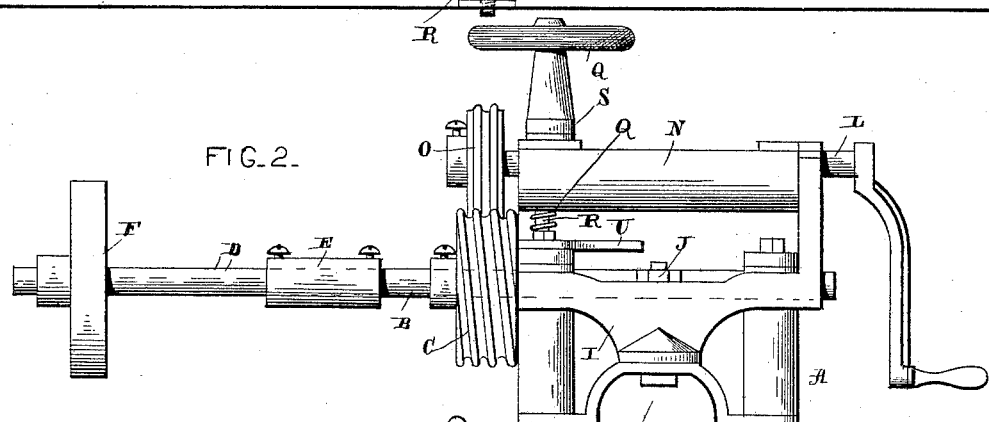
Figure 3:
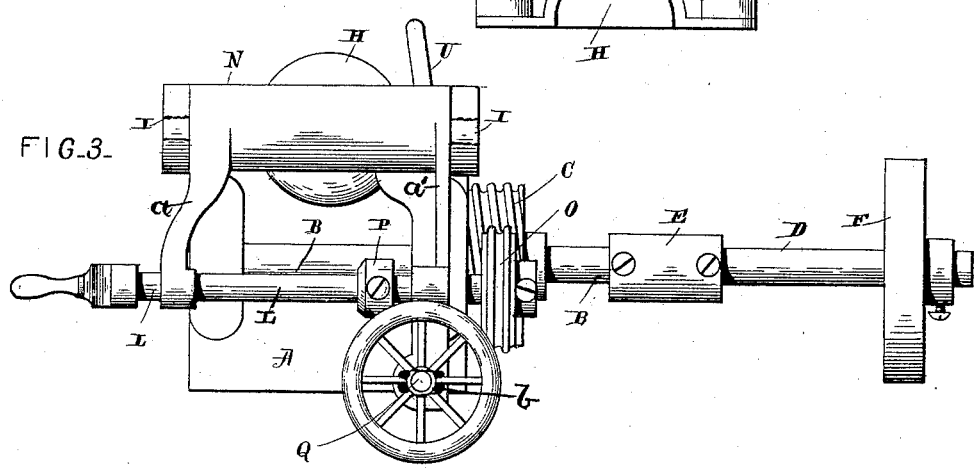

Figures 1 and 2 are elevations of a machine to which my invention is applied, taken from opposite sides. Fig. 3 is a plan view of the same.

A represents the lower and stationary portion of the frame, which is to be secured to a suitable support and in which the shaft B, carrying a suitable die C, is journaled. This shaft B has only a rotary movement, and dies of different sizes and constructions will be used, according to the kind of work that is to be done. If screw-threads are to be made in the pipes, a die such as shown will be used; but if pipes or tinware are simply to be grooved dies of a different kind will be substituted. In order to support the outer end of the pipe that is being grooved, an extension-shaft D is connected to the shaft B by means of a collar E, and upon this extension-shaft is placed an adjustable flanged supporting-disk F, which serves to center and hold the pipe in a line with the shafts B and D, and thus enable a perfectly straight and regular groove to be made in the pipe. This disk F can be adjusted back and forth upon the shaft D, so as to accommodate the length of the pipe that is being grooved or threaded; but the disk is prevented from turning upon the shaft D by means of a set-screw or stop, which catches in a groove in the end of the shaft.

Upon the top of the rear side of the frame A is formed a suitable rise or projection H, and upon this part H is placed the movable portion I of the frame. This frame I is pivoted upon the part H by means of a pivotal bolt J, so that the said frame can be swung around upon the said bolt to place the shaft carried thereby at an angle to the shaft B, as will hereinafter appear. Where the ends of pipe or other articles are being threaded the two shafts should stand at an acute angle to each other; but where the articles are being simply grooved the shafts should stand in a straight line.

Journaled or pivoted in the upper portion of the movable part I of the frame is the bearing N, which is provided with horizontally-extending arms $a\ a'$, in which the upper shaft L is journaled, and the outer ends of the said arms have a rising-and-falling movement, so that the die O upon the shaft L has a slight play, and thus accommodates itself to the thickness of the pipe or article that is being threaded or grooved. The shaft L has an endwise play through the bearing N, that is limited by the collar P. If a pipe is to be threaded, the two shafts should be at a slight angle to each other, and then the shaft L may move endwise through its bearings as far as the collar P will permit. This collar serves to limit the length of the thread that is to be formed in the pipe. As here shown, the die O has flanges which extend straight around it; but if the articles are to be simply grooved instead of threaded another form of die will or may be used and then the collar P will be adjusted so that the shaft L will have no endwise movement.

Passing vertically through a slot $b$, formed in the extended end of the horizontal arm $a'$, is the screw Q, which is made sufficiently long to pass down through the frame A, or through both the frame A and the support, as may be desired. Applied to this screw between the frame and the bearing is a spring R, which serves to move the bearing upward as fast as the screw will allow. Placed upon the top of the bearing and through which the screw passes is a rubber washer S, which allows the bearing N just sufficient play to enable the die O to rise sufficiently to pass over the double thickness of the material or any irregularities. By means of the pivoted bearing and the screw the amount of pressure that is to be brought upon the articles that are to be grooved or threaded is regulated at will. Pivoted upon the top of the frame A is a lever U, which has its inner end so shaped as to catch in the recess in the inner end of the die, and thus prevent the lower shaft from revolving while the pipe is being unscrewed from the die. By locking the die in place the pipe can be readily and easily removed from position. When an elbow is being threaded, the support F will not be used.

Having thus described my invention, I claim—

1. In a metal-grooving machine, a base, a shaft journaled therein carrying a die, a frame pivoted to turn horizontally on the said base, horizontal bearings on said frame, a shaft journaled in the said bearings, and a die mounted on the shaft, which is adapted to operate in conjunction with the first-named die in the manner set forth, the parts being combined as shown and described.

2. In a metal-grooving machine, a base, a shaft journaled therein carrying a die, a frame pivoted to turn horizontally on the said base, horizontal pivoted bearings on the said frame, a shaft journaled in the said bearings, and a die mounted on the said shaft, which is adapted to operate in conjunction with the first-named die in the manner set forth, the parts being combined substantially as shown and described.

3. In a metal-grooving machine, a main shaft carrying a die, a frame, arms horizontally pivoted in the said frame and extending over the said main shaft, a second shaft journaled in the said arms and carrying a die, and a screw-rod passing through one of the said arms for limiting the upward movement of the said arms, the parts combined substantially as specified.

In testimony whereof I affix my signature in presence of two witnesses.

WILLIAM A. LOTSPEICH.

Witnesses:
J. A. SURONY,
E. T. MILLER.